(12) United States Patent
Habas et al.

(10) Patent No.: US 7,420,620 B2
(45) Date of Patent: Sep. 2, 2008

(54) MULTI-PICTURE DISPLAY WITH A SECONDARY HIGH DEFINITION PICTURE WINDOW HAVING AN ADJUSTABLE ASPECT RATIO

(75) Inventors: Andrew G. Habas, Austin, TX (US); Jeffrey Stephens, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 563 days.

(21) Appl. No.: 11/069,302

(22) Filed: Mar. 1, 2005

(65) Prior Publication Data
US 2006/0197870 A1    Sep. 7, 2006

(51) Int. Cl.
H04N 5/45    (2006.01)
H04N 9/74    (2006.01)

(52) U.S. Cl. ........................ 348/565; 348/581

(58) Field of Classification Search ......... 348/563–565, 348/581, 582, 588; 345/660, 667, 670, 671; 382/298–300; 715/800, 801, 815; H04N 5/445, H04N 5/45, 9/74
See application file for complete search history.

(56) References Cited

U.S. PATENT DOCUMENTS

| | | | |
|---|---|---|---|
| 5,455,632 A * | 10/1995 | Ichihara | 348/565 |
| 6,144,412 A | 11/2000 | Hirano et al. | |
| 6,226,039 B1 | 5/2001 | Yoon | |
| 6,441,863 B1 * | 8/2002 | Miyazaki et al. | 348/581 |
| 6,456,305 B1 | 9/2002 | Qureshi et al. | |
| 6,493,036 B1 * | 12/2002 | Fernandez | 348/565 |
| 6,885,406 B2 * | 4/2005 | Yui et al. | 348/564 |

OTHER PUBLICATIONS

View Sonic, N2700w, http://www.viewsonic.com/products/desktopdisplays/lcdtv/n2700w, printed off Internet Dec. 16, 2004, 3 pgs.
View Sonic, N2700w LCD TV Display, viewsonic.com, 2004, 2 pgs.
Global Telemann Systems, Inc., About The HiPix™ DTV-200, 7 pgs.
Megenity, "Global Telemann Systems HiPix DTV-200", Stereophile Guide To Home Theater, May 2001, 8 pgs.
ViewSonic, N1700w, 2002, 35 pgs.
ViewSonic, N3000w LCD TV Display, User Guide, 2004, 34 pgs.
ViewSonic, N1700w, NexTVision LCD Display, User Guide, 2002, 35 pgs.

* cited by examiner

*Primary Examiner*—Sherrie Hsia
(74) *Attorney, Agent, or Firm*—O'Keefe, Egan, Peterman & Enders LLP

(57) ABSTRACT

Systems and methods for presenting high definition display signals in secondary windows of a display are disclosed. In one embodiment, the aspect ratio of a high definition content secondary window is adjustable. The high definition content secondary window may be a PIP, POP, PBP or other window. Furthermore, the image within the high definition content secondary window may be scaled in a wide variety of manners such that the image shape within the window may also be adjustable. Thus, in one embodiment both the window shape and the image shape within the window may be adjustable. Furthermore, the input format of the content presented to the display may be one of a wide variety of formats. In a further embodiment, the secondary window shape and image shape may be adjustable for a plurality of different input formats.

17 Claims, 2 Drawing Sheets

| Scaling Technique | INPUT 4:3 | 16:9 | <16:9 |
|---|---|---|---|
| 20 — STANDARD (4:3 is stretched linearly to fill screen, 16:9 is correct) | | | |
| 22 — ZOOM (crop top and bottom of 4:3, crop all sides of 16:9) | | | |
| 24 — 4:3 (4:3 is correct, 16:9 gets squeezed horizontally) | | | |
| 26 — WIDE (Non-Linear Scaling) (4:3 is 5% off the top and bottom. 16.5% non-linear stretch right & left) | | (Same as Standard) | (Same as Standard) |
| 28 — FULL SCREEN | (Same as Standard) | (Same as Standard) | |

*FIG. 1*
*(Prior Art)*

MULTI-PICTURE DISPLAY WITH A SECONDARY HIGH DEFINITION PICTURE WINDOW HAVING AN ADJUSTABLE ASPECT RATIO

TECHNICAL FIELD OF THE INVENTION

This invention relates to visual displays and, more particularly, to displays having a secondary high definition picture window.

BACKGROUND

Visual displays are utilized to present a wide variety of types of information including but not limited to television images, computer system content, information handling system content, still images, video clips, movie content, etc. Thus, the information presented on a visual display may originate from a wide variety of sources.

In some displays, two different images may be presented at the same time. For example, television displays may contain a feature known as picture-in-picture (PIP). In a PIP display, primary content may be presented on the display while secondary content may be presented in a secondary smaller window that overlays the primary content window. Thus primary content may be presented in a first window and secondary content may be displayed in a second window of the display. Other multi-window formats include, for example, picture-by-picture (PBP) and picture-outside-picture (POP). PBP formats generally provide two windows presented side by side on a display while POP formats may present a primary window on a display with one or more secondary windows next to the primary window (typically the secondary window being smaller). POP3, for example, may include three secondary windows to the side of the primary window and POP12 may include one centered primary window surrounded by 12 smaller secondary windows. Thus, a wide range of secondary window modes exist.

The source for the content of the information to be presented on a display may be provided to the display in a wide variety of interface formats including VGA (video graphics array), DVI (digital video interface), analog television, digital television, component video, composite video, s-video, HMDI (high definition multimedia interface), etc. formats. Digital video formats include, but are not limited to the high-definition television (HDTV) formats. High definition formats typically have 720 or more lines of resolution. Exemplary HDTV formats include 720p (1280×720 pixels), 1080i (1920×1080 pixels) and 1080p (1920×1080 pixels). High definition content is typically provided in consumer electronic products in one of a variety of interface formats including DVI, HDTV, component video, and HMDI (such formats may be called high definition consumer electronic interface formats). Displays compatible with digital display signals may still, however, utilize analog display signals to generate primary windows or secondary windows such as the PIP, PBP or POP windows.

As the use of digital and high definition content has increased, the aspect ratio of the displays themselves as also evolved. Whereas once displays were often shaped to conform to a 4:3 format aspect ratio common for analog television, displays may now often be found to have a 16:9 (wide) format aspect ratio. The content to be displayed on either a 4:3 or 16:9 sized aspect ratio display often may be content formatted in either 4:3 or 16:9 formats or other formats wider than 16:9, such as 2.23:1. When content of one format is presented on a display that has an aspect ratio of the other format the content may be presented with "black bars" at the top/bottom and/or left/right of the display window or alternatively the content may be sized to fit a given display window aspect ratio. A wide variety of scaling techniques are known in the art. FIG. 1 provides exemplary scaling techniques for a variety of different input signal aspect ratios to be presented on a display window that has an aspect ratio of 16:9. Each column of FIG. 1 relates to a different content input signal aspect ratio: column 10 being a 4:3 input, column 12 being a 16:9 input and column 14 being a <16:9 input. Each row of FIG. 1 corresponds to an exemplary scaling technique. Thus, for example, a 4:3 input signal provided with STANDARD scaling is represented at the intersection of column 10 and row 20. As may be visually seen from FIG. 1 such a combination results in the 4:3 input image being stretched horizontally to fill the 16:9 display window. STANDARD scaling and a 16:9 input provides a result with no stretching as shown by the intersection of column 12 and row 20. STANDARD scaling and a <16:9 aspect ratio input results in the presence of black bars as shown by the intersection of column 14 and row 20. Other scaling techniques may include row 22 ZOOM in which the top and bottom of a 4:3 input is cropped and all sides of a 16:9 or <16:9 input are cropped. Row 24 illustrates a 4:3 scaling technique in which a 4:3 input is shown in the correct aspect ratio with black bars, a 16:9 input is squeezed horizontally, and a <16:9 input is squeezed horizontally and vertically. The WIDE scaling technique shown in row 26 provides for a 4:3 input a non-linear scaling of 5% off the top and bottom and a 16.5% right left stretch (the 16:9 and <16:9 inputs being the same as the STANDARD scaling technique). The FULL SCREEN scaling technique of row 28 is the same as the STANDARD scaling technique except that <16:9 inputs are linearly stretched to fill the display window.

It is desirable to provide improvements in the methods and techniques for implementing secondary windows that display high definition content.

SUMMARY OF THE INVENTION

The present invention provides systems and methods for presenting high definition display signals in secondary windows of a display. In one embodiment, the aspect ratio of a high definition content secondary window is adjustable. The high definition content secondary window may be a PIP, POP, PBP or other window. Furthermore, the image within the high definition content secondary window may be scaled in a wide variety of manners such that the image shape within the window may also be adjustable. Thus, in one embodiment both the window shape and the image shape within the window may be adjustable. Furthermore, the input format of the content presented to the display may be one of a wide variety of formats. In a further embodiment, the secondary window shape and image shape may be adjustable for a plurality of different input formats.

In one embodiment, a method is disclosed for controlling a high definition secondary window of a visual display through the use of an adjustable secondary window aspect ratio. The method may comprise providing a high definition consumer electronic interface for receiving high definition signals in the visual display, providing a primary window for presenting content on the visual display; providing at least one secondary window for presenting high definition content from the high definition consumer electronic interface in a high definition mode within the secondary window, and providing the visual display with an adjustable window aspect ratio for at least one secondary window so that high definition content from the high definition consumer electronic interface may be presented in the at least one secondary window that has the adjustable window aspect ratio.

In another embodiment, a visual display for presenting high definition moving images is disclosed. The visual display may comprise multiple high definition consumer electronic interfaces, a primary window coupled to the multiple high definition consumer electronic interfaces so that high definition moving images may be displayed in the primary window, and at least one secondary window that has an adjustable window aspect ratio. The secondary window may be coupled to the multiple high definition consumer electronic interfaces so that the aspect ratio of the secondary window may be adjusted for use with high definition signals from different ones of a plurality of the multiple high definition consumer electronic interfaces.

In another embodiment a method of configuring a visual display for presenting high definition moving images is disclosed. The method may include providing a primary window and providing a plurality of secondary window modes for displaying one or more high definition moving images in one or more secondary windows. The method may further include providing a first adjustable aspect ratio for at least one secondary window when at least a first mode of the plurality of secondary window modes is selected and providing a second adjustable aspect ratio for at least one secondary window when at least a second mode of the plurality of secondary window modes is selected.

Still yet another embodiment is directed towards an information handling system. The information handling system may comprise a visual display and a plurality of user selectable high definition consumer electronic interfaces configured to be inputs to the visual display. The information handling system may also comprise a plurality of secondary window modes which are selectable to present different secondary windows on the visual display and an adjustable secondary window aspect ratio. The adjustable secondary aspect ratio can be utilized to adjust the secondary window aspect ratio in conjunction with signals from two or more of the plurality of high definition consumer electronic interfaces. Furthermore the adjustable secondary window aspect ratio can be utilized to adjust the secondary window aspect ratio for two or more of the plurality of secondary window modes.

DESCRIPTION OF THE DRAWINGS

It is noted that the appended drawings illustrate only exemplary embodiments of the invention and are, therefore, not to be considered limiting of its scope, for the invention may admit to other equally effective embodiments.

FIG. 1 illustrates exemplary imaging scaling techniques within a display window.

DETAILED DESCRIPTION OF THE INVENTION

Figure 2:
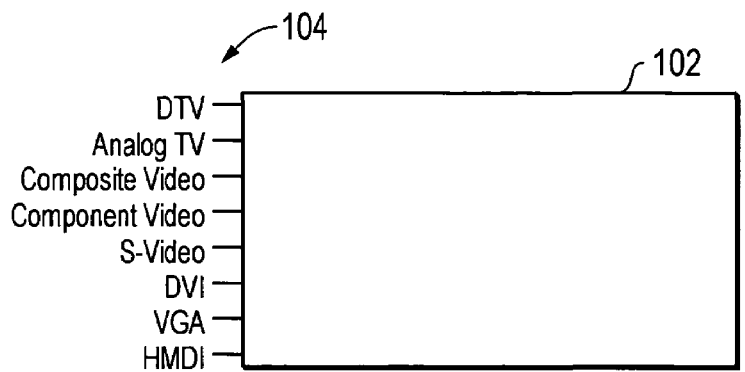
FIG. 2 is a block diagram of visual display and the inputs provided to a visual display.

FIG. 2 illustrates an exemplary visual display 102 which may include a plurality of inputs 104 for receiving content to be presented on the display. The inputs 104 may be configured to receive a wide variety of content formats. For example, a digital TV input (DTV) may be provided as shown. The digital TV input may be, for example, an Advanced Television Systems Committee (ATSC) compliant HDTV input. It will be recognized, however, that the DTV input may also be compatible with other high definition digital TV formats. The inputs 104 may also include an analog TV input such as a National Television Systems Committee (NTSC) compliant input as shown. Inputs 104 may further include composite video inputs, s-video inputs, component video inputs, DVI inputs, VGA inputs and HMDI inputs. Thus, a wide range of interfaces are provided that may be utilized to input moving image content into the visual display 102. It will be recognized that the display techniques described herein may be utilized with other content formats and content sources and that these techniques are not limited to the formats and sources described herein. Thus the visual display 102 may receive and display high definition content received, for example, through a variety of high definition consumer electronic interface formats.

Figure 3A:
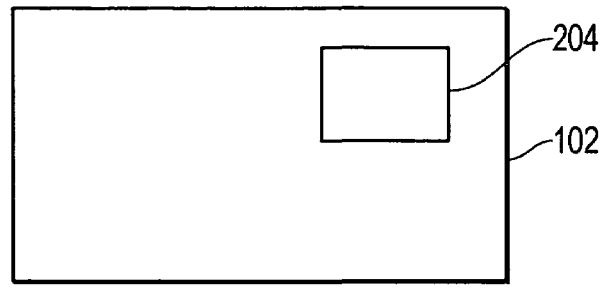
FIGS. 3A-3C are diagrams of visual displays showing secondary windows having differing window aspect ratios.
Figure 3B:
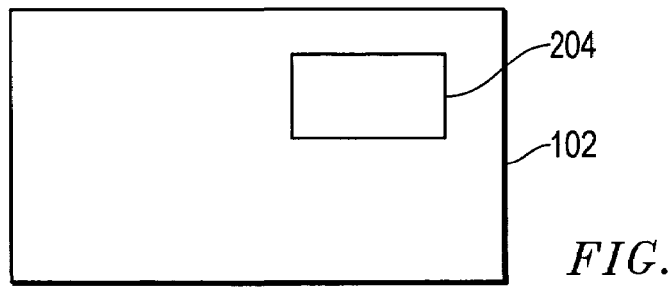
Figure 3C:
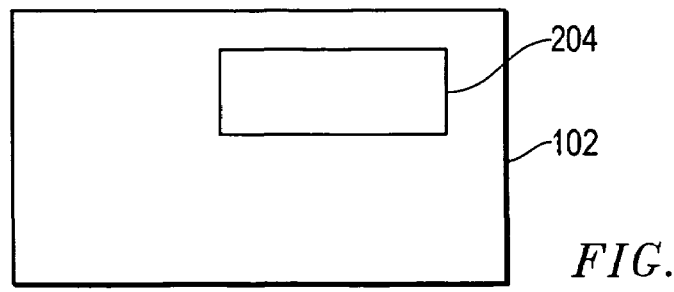

FIGS. 3A-3C illustrate the use of a visual display that has a high definition content secondary window that is adjustable. The illustration of the adjustable secondary window is provided in FIGS. 3A-3C with reference to an embodiment applying the techniques to a PIP secondary window mode. It will be recognized however that the techniques shown and described may be similarly applied to PBP and/or POP secondary window modes or any other secondary windows mode. Furthermore, the illustrations of FIGS. 3A-3C are made with regard to a visual display 102 that has physical dimensions that conform to a 16:9 aspect ratio. In addition, the techniques described herein with regard to the secondary window may be utilized independent of the physical dimensions of the visual display or the aspect ratio of a primary window displayed on the visual display 102.

As shown in FIG. 3A, the visual display 102 may include a secondary window 204 (the exemplary secondary window being a PIP window). The secondary window 204 may be configured to have a first aspect ratio, such as for example, a 4:3 aspect ratio. In accordance with the techniques described herein, the visual display 102 is configured to allow the secondary window aspect ratio to be adjustable to a plurality of aspect ratios. Thus, as shown in FIG. 3B the aspect ratio of the secondary window 204 may be adjusted to a 16:9 ratio. Furthermore, the aspect ratio of the secondary window may be further adjusted to other ratios. For example, as shown in FIG. 3C, the secondary window 204 is shown with an aspect ratio of X:9, where X is greater than 16.

In one embodiment, the secondary window aspect ratio may be selectable to preset aspect ratios such as 4:3, 16:9, etc. In an alternatively embodiment the aspect window may be variably adjusted such as through the use of a pointer and a click and drag function or through the use of scroll-bars or the like. Such techniques generally entail a selection of the aspect ratio by a user of the visual display such that the aspect ratio may be selected to a non-preset aspect ratio. Alternatively, the visual display may be configured to receive specific aspect ratio input data from the source of the content that designates the most desirable aspect ratio. The aspect ratio input data may be in the form of some sort of data flag that accompanies the content to indicate the proper aspect ratio. The aspect ratio may then be automatically set by the visual display to conform to the content's aspect ratio. In yet another alternative, the proper aspect ratio may be automatically determined by the visual display based upon an analysis of the content itself in which case the visual display determines the original aspect ratio of the content provided to the display. In this manner the display may automatically set the aspect ratio of the secondary window to match the aspect ratio of the content presented in the secondary window.

A variety of benefits are obtained through the use an adjustable secondary window. For example, if the secondary window is set to a 4:3 aspect ratio and 16:9 formatted content is desired to be displayed on the secondary window, then the secondary window may be converted to a 16:9 aspect ratio window. In this manner the 16:9 content can be displayed without having to be displayed on a 4:3 aspect ratio window with the use of "black bar" or "letter box" format. Similarly, if the secondary window is set to a 16:9 aspect ratio and 4:3 formatted content is desired to be displayed, the secondary window may be changed accordingly and the content may be displayed without black bars or scaling the image. In this manner the aspect ratio of the secondary window may be modified according to the format of the content to be displayed. The adjustable aspect ratio of the secondary window may be particularly advantageous as high definition content is increasingly provided in non-standard aspect ratio formats. The aspect ratio techniques described herein with regard to a secondary window may also be applied to the primary window.

Utilizing the techniques described above the visual display user and/or the display itself may independently set the aspect ratio for every window. In addition, the adjustable aspect window may be applied to any window regardless of input source. Thus, the adjustable aspect ratio may be applied to any primary or secondary window that is provided content from information handling formats (such as VGA, DVI, and HMDI), video formats (such as composite video, S-video and component video), standard analog television and high definition television formats, and other moving image formats. In this manner maximum user flexibility is provided to the primary window aspect ratio, PIP secondary window aspect ratio, PBP secondary window aspect ratio and POP secondary window aspect ratio.

As described above the aspect ratio of the secondary window (i.e. the shape of the window) may be adjusted. In conjunction with the adjustable aspect ratio, the size of any secondary window of a given aspect ratio may also be adjustable. In addition, the horizontal and vertical position of the secondary window may also be adjustable.

Even though the aspect ratio of the secondary window described above is adjustable, it may still be desirable to provide further adjustment of the image presented in the secondary window by scaling the image. For example, if only preset aspect ratios are provided for the secondary window and the format of the content to be provided in the secondary window does not match the preset aspect ratios, then it may be desirable to scale the image within the secondary window of a given aspect ratio. In addition, a user may desire a particular aspect ratio for a secondary window (for example to achieve a desired PBP or POP layout) and in such a situation may therefore desire to scale the image within the secondary window.

Any of a variety of image scaling techniques known in the display art may be applied to the image within the secondary window. For example, if the secondary window is provided with an aspect ratio of 16:9, the image within the secondary window may be scaled according to the STANDARD, ZOOM, 4:3, WIDE, or FULL SCREEN scaling techniques as shown in FIG. 1. It will be recognized, that such scaling techniques may also be applied to secondary windows having an aspect ratios of 4:3 or <16:9 as the scaled images of FIG. 1 are merely exemplary of scaling applied to an image presented in a 16:9 display window. Thus, any of a plurality of scaling techniques may be provided to images displayed in any of a plurality of secondary window aspect ratios.

In one embodiment of a system according to the present disclosure, any input signal may be utilized as the source for the secondary window. In addition, the aspect ratio of the secondary window may be adjustable independent of which input signal format is selected as the source for the secondary window. Furthermore, independent of the input signal source format used for the secondary window and the selected secondary window aspect ratio, any of a plurality of scaling techniques may be applied to the image of the secondary window. Finally, all of these techniques may be applied to any one of a variety of types of secondary window modess such as, for example, PIP, POP, or PBP secondary window modes. Thus in one embodiment, independent adjustment and selection is provided for each of (1) the type of secondary window mode, (2) the secondary window content input source format, (3) the secondary window aspect ratio and (4) the secondary window scaling technique. In this fashion, the user of a visual display is provided with an extensive array of choices to optimize and customize the secondary window to meet the individual user's desires. Such high flexible systems for providing display images in a secondary window are particularly useful for high definition consumer electronics interface applications.

The visual displays described herein may be utilized in conjunction with or as part of a wide variety of electronic systems including, for example, information handling systems. As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment or other purposes. For example, an information handling system may be a personal computer, a server computer system, a network storage device, a TV set-top box, a TV tuner, a DVD player, a digital video recorder or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for controlling a high definition secondary window of a visual display, comprising:
    providing a high definition consumer electronic interface for receiving high definition signals for displaying high definition content in the visual display;
    providing a primary window for presenting content on the visual display;
    providing at least one secondary window for presenting high definition content from the high definition consumer electronic interface in a high definition mode within the secondary window;
    providing the visual display with an adjustable window aspect ratio for at least one secondary window so that high definition content from the high definition consumer electronic interface is presented in the at least one secondary window that has the adjustable window aspect ratio; and
    providing a plurality of different high definition consumer electronic interfaces for receiving high definition signals in the visual display, wherein the adjustable window aspect ratio is applied to at least one secondary window independent of which of at least two different ones of the plurality of different high definition consumer electronic interfaces is utilized.

2. The method of claim 1, further comprising providing at least one scaling technique for scaling the high definition content within the secondary window that has the adjustable window aspect ratio.

3. The method of claim 1, further comprising providing a plurality of secondary window modes, wherein the adjustable window aspect ratio may be applied to at least one secondary window of two or more of the plurality of secondary window modes.

4. A method for controlling a high definition secondary window of a visual display, comprising:
    providing a high definition consumer electronic interface for receiving high definition signals for displaying high definition content in the visual display;
    providing a primary window for presenting content on the visual display;
    providing at least one secondary window for presenting high definition content from the high definition consumer electronic interface in a high definition mode within the secondary window;
    providing the visual display with an adjustable window aspect ratio for at least one secondary window so that high definition content from the high definition consumer electronic interface is presented in the at least one secondary window that has the adjustable window aspect ratio;
    providing a plurality of secondary window modes, wherein the adjustable window aspect ratio is applied to at least one secondary window of two or more of the plurality of secondary window modes; and
    providing a plurality of different high definition consumer electronic interfaces for receiving high definition signals in the visual display, wherein the adjustable secondary window aspect ratio is applied to at least one secondary window independent of which of at least two different ones of the plurality of different high definition consumer electronic interfaces is utilized.

5. A visual display for presenting high definition moving images, comprising:
    multiple high definition consumer electronic interfaces;
    a primary window coupled to the multiple high definition consumer electronic interfaces so that high definition moving images are displayed in the primary window; and
    at least one secondary window that has an adjustable window aspect ratio, the secondary window coupled to the multiple high definition consumer electronic interfaces so that the aspect ratio of the secondary window is adjustable for use with signals from different ones of a plurality of the multiple high definition consumer electronic interfaces.

6. The visual display of claim 5, further comprising a plurality of secondary window scaling techniques.

7. The visual display of claim 6, further comprising a plurality of secondary window modes, wherein the adjustable window aspect ratio is applied to at least one secondary window of two or more of the plurality of secondary window modes.

8. The visual display of claim 7, wherein the adjustable window aspect ratio includes preset aspect ratios.

9. The visual display of claim 7, wherein the adjustable window aspect ratio includes a variably adjustable aspect ratio.

10. A method of configuring a visual display for presenting high definition moving images, comprising:
    providing a primary window;
    providing a plurality of secondary window modes for displaying one or more high definition moving images in one or more secondary windows;
    providing a first adjustable aspect ratio for at least one secondary window when at least a first mode of the plurality of secondary window modes is selected;
    providing a second adjustable aspect ratio for at least one secondary window when at least a second mode of the plurality of secondary window modes is selected;
    providing multiple secondary window scaling techniques for the first mode of the plurality of secondary window modes and multiple secondary window scaling techniques for the second mode of the plurality of secondary window modes; and
    providing a plurality of high definition interfaces for providing the high definition moving images to the at least one secondary window, the first adjustable aspect ratio and the second adjustable aspect ratio being adjustable independent of which of the plurality of high definition interfaces is utilized for providing the high definition moving images.

11. The method of claim 10, wherein the aspect ratio for at least one secondary window is automatically selected by the visual display based upon the content to be displayed in the secondary window.

12. The method of claim 10, wherein the plurality of secondary window modes includes two or more of PIP, POP or PBP modes.

13. An information handling system having, comprising:
a visual display;
a plurality of user selectable high definition consumer electronic interfaces configured to be inputs to the visual display to display high definition content;
a plurality of secondary window, modes which are selectable to present different secondary windows on the visual display; and
an adjustable secondary window aspect ratio, wherein the adjustable secondary aspect ratio can be utilized to adjust the secondary window aspect ratio in conjunction with signals from two or more of the plurality of high definition consumer electronic interfaces and wherein the adjustable secondary window aspect ratio can be utilized to adjust the secondary window aspect ratio for two or more of the plurality of secondary window modes.

14. The information handling system of claim 13, wherein a plurality of secondary window scaling techniques are available for application to the secondary window.

15. The information handling system of claim 14, wherein the adjustable secondary window aspect ratio is adjustable independent of which high definition consumer electronic interface is utilized to provide signals for the secondary window and independent of which secondary window mode is selected.

16. The information handling system of claim 15, wherein the adjustable secondary window aspect ratio is automatically selected based upon the content to be displayed in the secondary window.

17. The information handling system of claim 13, wherein the adjustable secondary window aspect ratio includes non-preset selectable aspect ratios.

* * * * *